United States Patent [19]

Tresselt

[11] 3,766,554

[45] Oct. 16, 1973

[54] RANGE CUTOFF SYSTEM FOR DUAL FREQUENCY CW RADAR

[75] Inventor: Carl P. Tresselt, Detroit, Mich.

[73] Assignee: The Bendix Corporation, Southfield, Mich.

[22] Filed: Mar. 1, 1971

[21] Appl. No.: 119,780

[52] U.S. Cl.................... 343/14, 343/9, 343/12 R, 343/17.5
[51] Int. Cl............................................. G01s 9/24
[58] Field of Search.................. 343/8, 9, 12 R, 14, 343/17.5

[56] References Cited
UNITED STATES PATENTS

| | | | |
|---|---|---|---|
| 3,101,470 | 8/1963 | Vosburgh et al. | 343/9 |
| 3,155,972 | 11/1964 | Boyer | 343/12 R |
| 3,659,293 | 4/1972 | Gupta | 343/14 |

*Primary Examiner*—T. H. Tubbesing
*Attorney*—Lester L. Hallacher and Plante, Hartz, Smith & Thompson

[57] ABSTRACT

A system for making a CW radar system insensitive to targets lying beyond a preselected maximum range is described. Two discrete frequencies are alternately transmitted so that two doppler frequencies are produced in the receiver. The phase relationship between the two doppler signals is indicative of the range between the target and transmitting antenna. Range cutoff is achieved by turning off the transmitter for an interval between the transmission of the two frequencies and by gating the homodyne receiver so that video output is provided only during the last quarter of each transmitted signal. Because the transmitter and receiver are inactive at chosen time intervals, complete receiver insensitivity is realized for targets beyond the cutoff range, irrespective of the size and other physical characteristics of the targets.

26 Claims, 5 Drawing Figures

INVENTOR
CARL P. TRESSELT

BY

ATTORNEY

RANGE CUTOFF SYSTEM FOR DUAL FREQUENCY CW RADAR

CROSS-REFERENCE TO RELATED APPLICATIONS

Application Ser. No. 42,651, filed June 2, 1970 now U.S. Pat. No. 3,659,293, by Radha R. Gupta, entitled "Range Detecting Doppler Radar," and assigned to the assignee of the subject application, describes in detail a dual frequency CW radar system in which the inventive system can be employed.

BACKGROUND OF THE INVENTION

The intended operation of various types of continuous wave doppler radar systems dictates that the systems be insensitive to targets lying beyond a maximum preselected range. As an example, the adaptive speed control system described in the above-identified application is intended to operate with targets present within approximately 300 feet, and accordingly preferably is insensitive to targets lying outside that range. The desired insensitivity to targets beyond the maximum intended range cannot be achieved simply by adjusting the sensitivity of the receiver, because large targets lying beyond the maximum range may reflect essentially the same signal as small targets lying within the maximum range. Accordingly, the receiver is incapable of distinguishing between these two types of targets. As a consequence, it is necessary either to somehow distinguish between large targets lying outside the intended maximum range and small targets within the range, or to render the system insensitive to the targets lying beyond the maximum range.

A system for rendering the radar insensitive to targets beyond the maximum range is perhaps the most readily feasible and less expensive type of system. Because the radar system is continuous wave, the range gate techniques frequently used with pulse radar systems are not applicable. As a consequence, various other types of range cutoff systems have been proposed for continuous wave doppler radar systems. The various systems presently available are not completely satisfactory because some doppler response is exhibited, even for ranges extending well beyond the intended cutoff range. It is therefore necessary in these systems to design the receiver so that it distinguishes return signals which are received from targets beyond the intended cutoff range. This sometimes is done by adjusting the sensitivity of the receiver and sometimes by maximizing the phase sensitivity of the receiver so that only targets within a preselected range are injected into the receiving system.

SUMMARY OF THE INVENTION

The invention range cutoff technique is useful with a dual frequency CW radar system and provides complete insensitivity to targets for a significant distance beyond the selected maximum range, irrespective of the size and physical characteristics of the target. In a dual frequency CW radar system, two discrete frequencies are alternately transmitted so that two doppler frequencies are produced in the receiver. The range between the transmitting antenna and the target reflection the transmitted energy is indicated by the phase relationship between the two doppler frequencies.

Range cutoff in accordance with the invention technique is achieved by turning off the transmitter so that no energy is transmitted for a preselected period of time between the transmission of the two discrete frequencies. Also, a gating pulse is applied to the receiver so that the receiver is actuated or open only during the last quarter of the time period during which one of the frequencies is transmitted. As a consequence, range cutoff is achieved for two reasons. Firstly, energy which is received by the receiver at a time when the transmitter is cut off will produce no doppler because there is no sample of a transmitted frequency present in the receiver with which to mix the return signal to produce a doppler frequency. Furthermore, because the receiver is closed for three-fourths of each transmission period, only reflected energy received during the one-fourth "on" time will be injected into the doppler channels.

The system is particularly advantageous because targets lying immediately outside the maximum cutoff range and extending up to a second maximum range produce zero doppler in the receiver because no transmitter reference signal is present for producing such a doppler. Large targets beyond the second preselected range may produce an output signal because the second transmitted signal will mix with received reflection of the first transmitted frequency. These outputs will not have the character of a normal doppler signal because of the relatively large difference between the two transmitted frequencies. Such extraneous signals will typically be rejected by the bandpass characteristic of the doppler velocity processor used with the system.

Targets extending well beyond the preselected range and which cause the mixing of the first transmitted frequency with a subsequently transmitted signal of the same frequency will not cause the production of a signal by the receiver because of the attenuation factor of the transmitted signal. This is so because the transmitted signal is attenuated in accordance with the fourth power of the range, and therefore signals received from targets at this range are attentuated to such an extent that they are below the sensitivity level of the homodyne receiver.

BRIEF DESCRIPTION OF THE DRAWINGS

FIG. 2 Waveform b shows the R-f output of the transmitter system.

FIG. 2 Waveform c shows the waveform which is used to gate the $f_1$ receiver channel.

FIG. 2 Waveform d shows the waveform which is used to gate the $f_2$ receiver channel.

FIG. 2 Waveform e shows the R-f return pulse received by the receiver.

FIG. 2 Waveform f shows the doppler signal injected into the $f_1$ channel of the receiver.

FIG. 2 Waveform g shows the doppler signal injected into the $f_2$ channel of the receiver.

FIG. 4 shows the voltage and frequency output characteristics of a Gunn diode.

DETAILED DESCRIPTION

Range and velocity measurements can be obtained by CW radar system using a square wave dual frequency modulation. A full description of such a system is presented in application, Ser. No. 42,651, fully referenced hereinabove. In this type of system, two discrete frequencies are alternately transmitted by properly modulating the transmitter. Two receiving channels are individually gated in synchronism with the transmitter modulation so that separate doppler signals are produced in the two receiver channels. A phase comparison between the two doppler signals gives an indication of range to the target according to the relationship:

$$\phi = 2\pi (2R/C)(f_2 - f_1) \quad (1)$$

where:
$\phi$ = the relative phase between the channels
$R$ = the range to the target
$C$ = the speed of light
$f_2$ and $f_1$ are the two transmitted frequencies The relative velocity between the transmitting system and the target can be obtained by noting the doppler frequency in one or other of the two channels in accordance with the relationship:

$$f_d = (2V/C) f \quad (2)$$

where:
$f_d$ = the doppler frequency
$V$ = the relative velocity
$C$ = the speed of light
$f$ = the transmitted frequency The above relationship (1) for determining range is ambiguous after a particular range because the return signals from ranges past $\pi$ radians are treated by the electronic phase comparator as if they were within the region from 0 to $\pi$ radians. Although a radar signal is attenuated in accordance with the fourth power of the range, targets of large R-f cross-section lying beyond the unambiguous range of 0 to $\pi$ radians give rise to undesirable responses because they are falsely identified as close-in targets.

The inventive system overcomes the disadvantage of the prior art systems by proving a positive range cutoff at a preselected range defined as $\pi$ radians. Range cutoff beyond $\pi$ radians is achieved by turning off the transmitter for a selected period of time between the transmission of the two discrete frequencies. Also, the receiver is gated on only during the last fourth of the transmission time of the two frequencies. Because of the off and on duty cycle of the transmitter and receiver reflections from targets that arrive during the off period result in no output indication in the receiver because the receiver does not at that time contain a sample of the transmitted frequency. Also, receiver indications because of overlap between two sequentially transmitted signals are greatly decreased because the receiver is off for three-fourths of each transmission period. Consequently, reflections of the first transmitted frequency from many distant targets are received when a sample of the second transmitted frequency is present in the receiver, but during the off time of the receiver, and therefore have no effect on the system.

Figure 1:
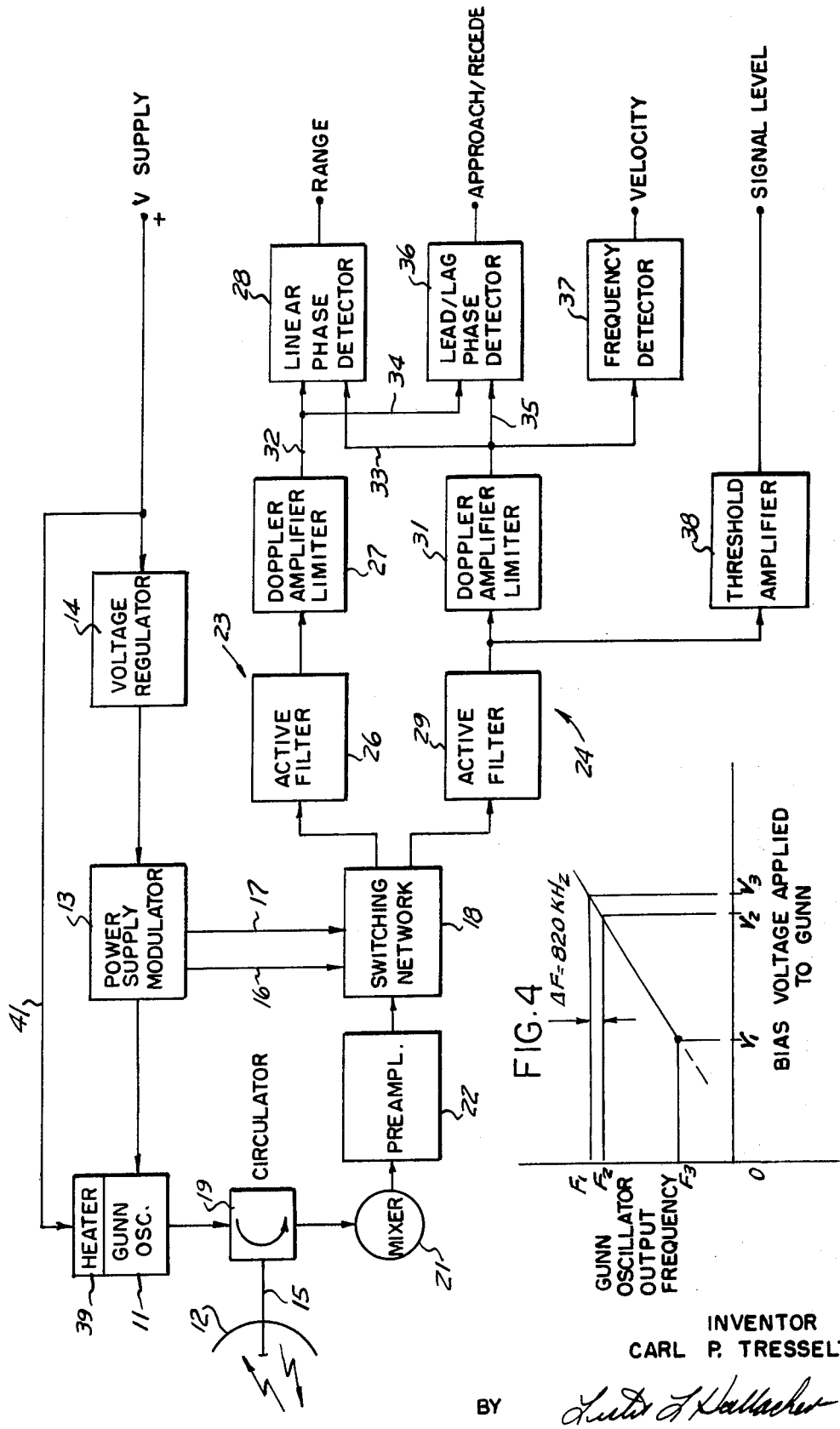
FIG. 1 is a block diagram of a preferred embodiment of the inventive system.

FIG. 1 shows a preferred embodiment of a system employing the inventive concepts. An Oscillator 11 is used to generate the R-f frequency which is transmitted by the Antenna 12. Antenna 12 also receives the energy reflected from a target (not shown). Oscillator 11 is modulated by Modulator 13 so that at least two discrete frequencies are produced. As an example, Oscillator 11 can be a Gunn diode. As is known, a Gunn diode is a device which simultaneously can serve as an oscillator and a mixer. As an oscillator, a Gunn diode produces an R-f output, the frequency of which is dependent upon the biasing voltage applied to the diode. Accordingly, by changing the biasing voltage, the frequency of the R-f output can be changed. As an alternative scheme, the Gunn diode could be directly coupled to the antenna which simultaneously transmits and receives energy. The diode itself would serve to mix the two signals and produce a doppler output signal. It should be noted that, in either embodiment, the use of a Gunn diode is not essential to the system as a similar device, such as an avalanche diode, can also be used. Furthermore, still other types of oscillators can be used in the embodiment of FIG. 1 if desired, the only requirement being that they be capable of transmitting two discrete frequencies at predetermined intervals of time.

FIG. 4 shows an idealized frequency output characteristic of a positive modulation coefficient Gunn diode in response to three different biasing voltages. The R-f output is zero for all biasing voltages below a level of $V_1$, the threshold of the diode. Above a biasing voltage of $V_1$ the output frequency changes in accordance with the voltage level. Consequently, a frequency $f_1$ is realized with a biasing voltage $V_3$. A different output frequency $f_2$ is realized with a biasing voltage $V_2$. The frequency changes which occur for a particular voltage change are obviously dependent upon the particular type of diode and cavity used. A complete discussion is present in "Amplitude and Frequency Modulation of a Waveguide Cavity CW Gunn Oscillator," W. C. Tsai and F. J. Rosenbaum, *IEEE Transactions on Microwave Theory and Techniques*, Vol. MTT-18, No. 11, Nov. 1970, pp. 877–884. As an example, a frequency difference of 820 KHz is desired for a 300 foot range system; this deviation was achieved in a commercially available 36 GHz Gunn oscillator when the difference between $V_2$ and $V_3$ was 0.1 volts. In order to achieve a rapid transition between the off and on states, a biasing voltage which is just slightly less than $V_1$ is applied to the Gunn diode during the off state.

Another mode of operation is also possible. If a voltage slightly higher than $V_1$ is applied to the Gunn diode an output will be generated by the diode. However, this output will be very low in power and will be ineffective in producing a response in the system. The effective output of the Gunn will therefore be zero. When the voltage to the Gunn diode is increased to a level such as $V_2$ and $V_3$, the power output will increase very rapidly and a useful power level realized. Accordingly, as used herein, the "off" condition of the transmitter includes this "slightly on" condition.

Figure 5:
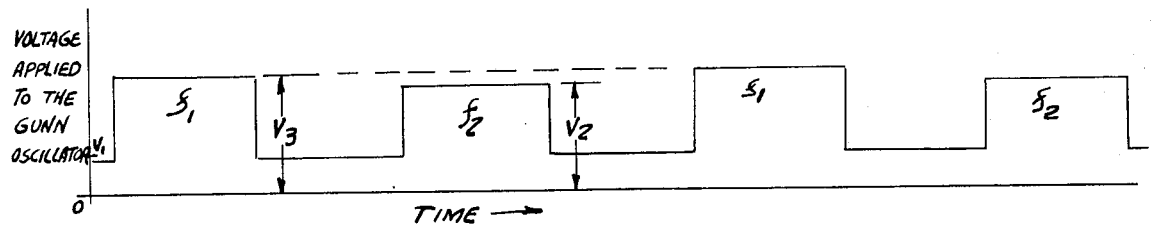
FIG. 5 shows the modulation waveform applied to a Gunn diode having the operational characteristics shown in FIG. 4 to achieve the output waveform of FIG. 2b.

FIG. 5 shows the waveform which is applied to Gunn Oscillator 11 in order to realize the desired frequency outputs of the oscillator. During the off time a biasing voltage which is slightly less than $V_1$ is applied to the Gunn diode. A flat topped pulse having a voltage level $V_3$ is then applied to the diode so that the frequency $f_1$ is generated by the diode during the application of this signal. The biasing voltage is then reduced to slightly less than the $V_1$ level for a given period of time. At the expiration of the desired off time the flat topped pulse voltage $V_2$ is applied so that the frequency $f_2$ is realized as the output of the oscillator. This sequence of biasing voltages continues throughout the operation of the system on a cyclic basis.

Referring again to FIG. 1, Power Supply Modulator 13 is used to modulate Gunn Oscillator 11 in the desired manner. The output of Modulator 13 can be applied directly to Gunn Oscillator 11. Alternatively, on-off modulation of the oscillator can be achieved by directly pulsing the Gunn diode. The output frequency changes would then be achieved by pulsing a separate element, such as a varactor or YIG sphere or other ferrite material. It should also be noted that a PIN diode can be used to tune the transmitter between frequencies $f_1$ and $f_2$ by using the PIN to change the reactance presented to the transmitter by other reactance elements. The change in reactance of the separate element would then tune the cavity containing the Gunn diode. The combination of these modulating signals then results in the desired output from the Gunn oscillator. Modulator 13 is actuated by a voltage source +V through a Voltage Regulator 14. Modulator 13 contains a square wave generator and the logic circuitry required to produce the desired waveforms. Various techniques for producing the required waveforms are available within the purview of those skilled in the art, and full details are not required herein.

Figure 2:
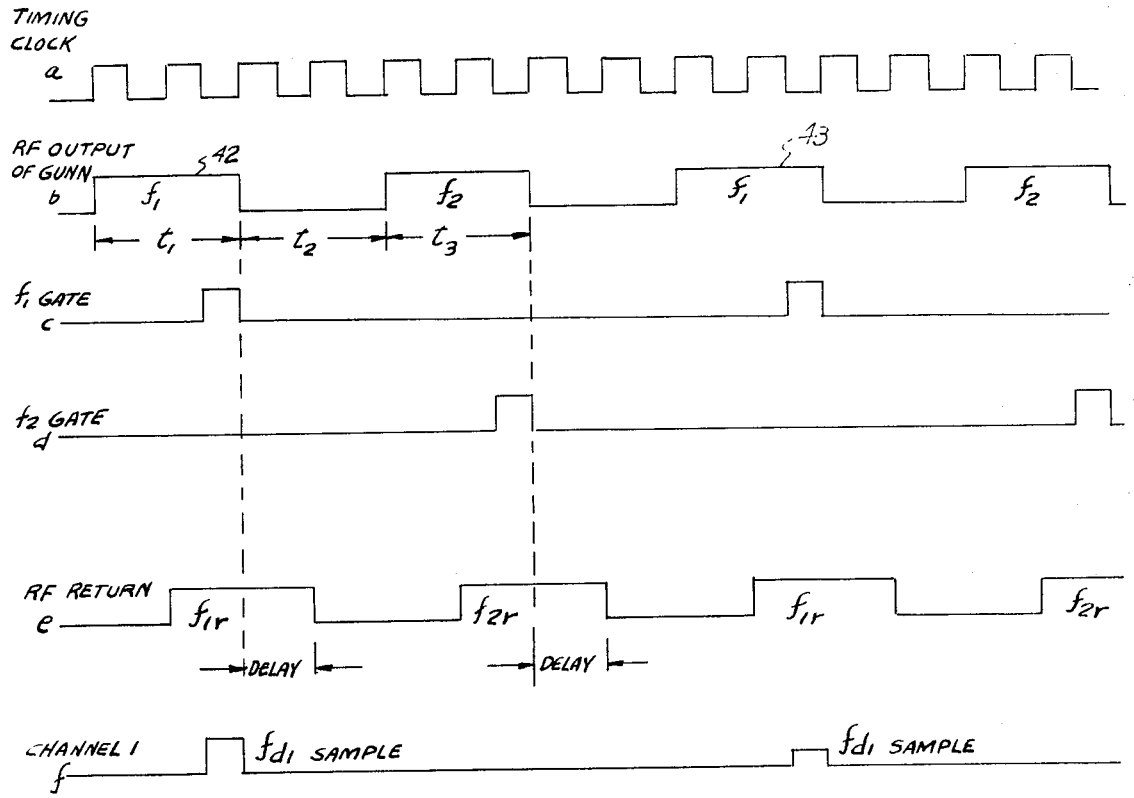
FIG. 2 Waveform a shows a square wave timing clock waveform.

However, briefly described, Modulator 13 generates a timing clock pulse of the type shown in Waveform a of FIG. 2. A clock repetition frequency of 3.33 megahertz produces the indicated clock period of 300 nanoseconds. The timing clock waveform Waveform a of FIG. 2 can then be used to drive a chain of binary dividers which ultimately supply the modulating voltages illustrated in FIG. 5 to the Gunn diode. The R-f output of the Gunn diode is then two discrete frequencies on a time-shared basis with the transmitter being shut off between the transmission of the two frequencies in the manner illustrated in Waveform b of FIG. 2.

As shown in Waveform b of FIG. 2, the transmitter generates an R-f output having a frequency $f_1$ for a period of time which is equal to twice the period of the timing clock pulse. The transmitter is then shut off for an equal period of time, after which time it is biased so that it generates an R-f output having a frequency $f_2$. The $f_2$ output is also applied for a time which is equal to twice the period of the clocking pulse train.

By the appropriate division and logic processing of the clocking pulse, the $f_1$ gate pulse shown in Waveform c of FIG. 2 and the $f_2$ gate pulse shown in Waveform d of FIG. 2 are also produced. The $f_1$ gate pulse is generated during the last fourth of the $f_1$ output signal. The $f_2$ gate pulse is produced during the last fourth of the $f_2$ output signal. The $f_1$ and $f_2$ gating pulses are applied to a Switching Network 18 over Lines 16 and 17, respectively.

Switching Network 18 contains the circuitry necessary for switching the single video output of the mixer in synchronism with the transmission of the frequencies $f_1$ and $f_2$ so that two samples of the discrete doppler frequencies $f_{d1}$ and $f_{d2}$ are routed to their respective channels.

The output of Oscillator 11 is injected into a Circulator 19. Circulator 19 directs the transmitted energy to Antenna 12 where it is propagated toward a target. Energy reflected back from the target is received by Antenna 12 and directed by Circulator 19 to a Mixer 21.

It should be noted that the antenna to circulator Waveguide Section 15 is intentionally mismatched so that a desired level of R-f leakage from the transmitter is routed by the Circulator 19 directly to Mixer 21 without passing via the antenna through free space. As a consequence, the leakage signal acts as a local oscillator in Mixer 21 in all instances during the transmission period of either frequency. Consequently, when a return signal is received by Antenna 12, it is directed by Circulator 19 to Mixer 21 where a sample of doppler frequency is generated. The sample of doppler signal is amplified to a desired level in a Preamplifier 22 and then directed to Switching Network 18. Switching Network 18 then serves to direct the doppler frequency sample to the two Channels 23 and 24 in synchronism with the transmission of the two transmitted frequencies $f_1$ and $f_2$.

FIG. 2 is again useful in understanding the operation of the system. A single cycle of the transmission period can be considered to be the total of transmission periods of the frequencies $f_1$ and $f_2$ and the off time in-between. These three periods are represented in Waveform b of FIG. 2 as $t_1$, $t_2$, and $t_3$. During the transmission time of frequency $f_1$, which occurs during time period $t_1$, the $f_1$ gating pulse shown in Waveform c of FIG. 2 is applied by a Line 16 to Switching Network 18. Furthermore, when a reflected signal is returned from the target, a delayed frequency signal $f_{1R}$ as shown in Waveform e of FIG. 2 is also present in the receiver. Accordingly, Mixer 21 contains the two frequencies $f_1$ and the reflected frequency signal $f_{1R}$ to produce a doppler frequency $f_{d1}$. Because the gate pulse of Waveform c of FIG. 2 is applied to the Switching Network 18, a 150 NS long sample of the doppler frequency $f_{d1}$ shown in Waveform f of FIG. 2 is applied to Channel 23.

During the time period $t_2$, no energy is transmitted by the oscillator, and therefore no sample of a transmitted frequency is present in Mixer 21. Therefore, if a reflected signal is received by the receiver, no doppler signal is generated in Mixer 21, and doppler Channels 23 and 24 produce no outputs. Furthermore, even if a doppler were produced it would not be injected into either of Channels 23 or 24 because there is no gate pulse to either of the channels. During the $t_3$ time period of the transmission cycle, a signal at a frequency of $t_2$ is transmitted. A sample of frequency $f_2$ is present in Mixer 21, and therefore a reflected signal having a frequency $f_{2R}$ as shown in Waveform e of FIG. 2 will result in the production of a doppler frequency $f_{d2}$. Because of the presentation of the $f_2$ gating pulse to Switching Network 18, the $f_{d2}$ doppler signal sample Waveform g of FIG. 2 is injected into doppler Channel 24.

Figure 3:
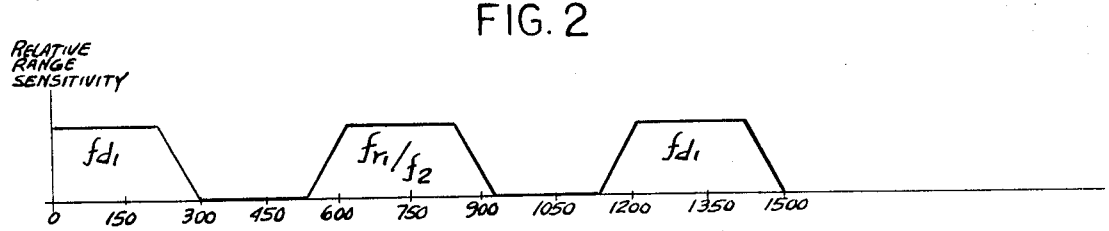
FIG. 3 shows the relative range sensitivity as a function of range produced by the above system, excluding the normal inverse fourth power of range power variation.

Several important aspects of the invention concept can now be appreciated by viewing FIG. 3 in conjunction with Waveforms a through g of FIG. 2. Firstly, any reflected signals received during the $t_2$ off period will have no effect on the system, because no doppler signal can be produced in the absence of a sample of a transmitted signal local oscillator. As a consequence, for the exemplary values presented above the system is completely insensitive to all targets lying within a range of 300 to 525 feet, as shown in FIG. 3.

Because of propagation delays, distant targets can cause signals of one frequency to arrive at the receiver while the other frequency is being transmitted. In FIG. 3 this is the range from 525 feet to 900 feet. The doppler signal caused by these signals typically will have no effect on the system, because it is outside of the doppler frequency acceptance range of the receiver.

FIG. 3 shows that there is zero sensitivity between 900 and 1,125 feet. This is also caused by the off time of the transmitter. The doppler generated for targets between 1,125 and 1,500 is caused by the mixing of a transmitted signal of one frequency and a reflection of an immediately preceding signal of the same frequency, i.e., in Waveform $b$ of FIG. 2, Signals 42 and 43. This doppler signal will have no effect on the receiver because the propagation attenuation is in accordance with the fourth power of range, and therefore the signal is below the sensitivity level of the homodyne receiver.

Targets within the range of zero to approximately 225 feet result in the production of a doppler frequency sample $f_{d1}$ during the transmission of frequency $f_1$. It will be appreciated that another doppler frequency sample $f_{d2}$ is produced within the zero to 225 feet range during the transmission of frequency $f_2$. All such targets are treated with equal relative sensitivity until the range of 225 feet is exceeded. At this point there is a transition region from 225 feet to 300 feet over which the receiver sensitivity drops to zero. The extent in range over which the transition region occurs depends on the narrowness of the sampling period. A gating period shorter than the 150 NS shown results in direct proportion in a shortening of the 75 foot long transition region. As the gate width is narrowed, however, useful received energy is being rejected, resulting in poorer sensitivity. The choice of a gate pulse indicated is a good compromise between transitional and sensitivity considerations.

It should be noted that FIG. 3 shows the receiver sensitivity for doppler frequency $f_{d1}$ available at Channel 23. A similar receiver sensitivity for doppler frequency $f_{d2}$ is also present for injection into Channel 24.

Channel 23 contains an active Filter 26 and a doppler Amplifier Limiter 27. Filter 26 is used to remove extraneous noise and undesirable signals, and more importantly, to turn the stream of narrow doppler sample pulses into an analog doppler voltage. Filter 26 therefore also serves the function of an interpreter. Amplifier Limiter 27 is used to amplify the analog doppler frequency signal to the desired amplitude level so that an essentially square or flat doppler signal is injected into a Linear Phase Detector 28.

Channel 24 is similar to doppler Channel 23 and is designed to process the doppler frequency samples $f_{d2}$. Accordingly, it also contains an active Filter 29 and an Amplifier Limiter 31.

As shown in FIG. 1, the outputs of Amplifiers 27 and 31 are applied to an Linear Phase Detector 28 over Leads 32 and 33, respectively. Phase Detector 28 generates an output signal which is proportional to the difference in phase between the two doppler frequencies. This phase difference is proportional to range as indicated by Equation (1) hereinabove. The output signal of Phase Detector 28 is therefore indicative of the range between the transmitting Antenna 11 and the target reflecting the energy.

The outputs of Amplifiers 27 and 31 are also injected into a Lead-Lag Phase Detector 36 over Leads 34 and 35, respectively. Lead-Lag Phase Detector 36 produces a signal which indicates whether the relative velocity is opening or closing. By using the doppler output of one of the channels as a reference and noting its leading or lagging relationship with respect to the other doppler output, the direction of the relative velocity can be obtained. It is therefore possible to detect whether the target and antenna are approaching one another or receding from one another.

The output of doppler Channel 24 is also applied to a Frequency Detector 37. Detector 37 measures the doppler frequency and generates an output which is indicative of the relative velocity between Antenna 12 and the target reflecting the energy in accordance with Equation (2) presented hereinabove.

It is now evident that the system is capable of measuring both the range and relative velocity between the target and the transmitting antenna and is also capable of producing an approach-recede signal to indicate whether the target and Antenna 12 are approaching or receding with respect to one another.

The output of Filter 29 is also directed to a Threshold Amplifier 38. Amplifier 38 produces a nonsaturation output signal when the output from Limiters 27 and 31 is sufficiently saturated to be capable of producing low noise range/velocity/lead-lag measurements. The output of Amplifier 38 is used to actuate the vehicle control system through a level sensitive circuit (not shown).

It should be noted that Frequency Detector 37 and Threshold Amplifier 38 have been shown actuated by doppler Channel 24. If desired, these circuits can be actuated by doppler Channel 23. Alternatively, if desired, both channels can be used to generate independent velocity and target present signals which are then averaged to produce the ultimately used velocity and target present signals.

FIG. 1 also shows a Heater 39 which is positioned adjacent to Gunn Oscillator 11. Heater 31 is energized by the V+ supply over a Lead 41. This heater contains a simple thermistor/transistor controller used to maintain Gunn oscillator temperature on cold days. This prevents serious variation in the $\Delta V/\Delta F$ deviation sensitivity of the oscillator. The actual $\Delta V$ required to produce 820 KHz deviation is also adjusted in Modulator 13 as a function of temperature. A varactor-tuned Gunn is somewhat less sensitive to thermal variations in deviation.

The invention as described at this point includes a circulator and a mixer so that a sample of the transmitted frequency is directed to the mixer through the circulator and the reflected signal received by the antenna is also directed to the mixer to thereby produce a doppler frequency. However, because a Gunn diode is capable of simultaneously performing the dual roles of an oscillator and a mixer, the circulator and mixer can be eliminated. In this configuration of the radar system the antenna and Gunn oscillator are directly coupled so that transmitted and reflected energy passes directly between the two elements. The doppler frequency is then developed in the Gunn Diode 11 and is injected to Preamplifier 22. Except for the elimination of Circulator 19 and Mixer 21, a system utilizing the frequency converter characteristics of a diode would be identical to the embodiment described and disclosed with respect to FIG. 1.

Several advantages of the inventive cutoff system are now apparent. Targets lying in the most troublesome range just beyond the cutoff range cause no response in the system because the system is turned off at the time when reflections from such targets are received. This is in marked contrast with existing systems which are troubled by targets near the cutoff range. Furthermore, the on-off duty cycle and receiver gating substantially reduce beating of the two transmitted frequencies.

What is claimed is:

1. A range cutoff system for a dual frequency continuous wave radar system, said radar system having a variable output frequency transmitter so that at least two discrete frequencies, $f_1$ and $f_2$, are alternately transmitted and a two-channel receiver for producing two doppler frequencies $f_{d1}$ and $f_{d2}$ in response to the reception of reflections of said transmitted frequencies; said range cutoff system including:

modulation means for modulating said transmitter so that said two frequencies $f_1$ and $f_2$ are alternately transmitted and said trasmitter produces no effective output for a preselected time period between the transmission of said frequencies $f_1$ and $f_2$.

2. The range cutoff system of claim 1 wherein said receiver further includes switching means for alternately actuating said two channels in synchronism with the transmission of said $f_1$ and $f_2$ frequencies;

and said modulation means modulates said switching means so that said channels are respectively responsive to received energy only during a portion of the time periods during which said $f_1$ and $f_2$ frequencies are respectively transmitted.

3. The range cutoff system of claim 1 wherein said transmitter includes a Gunn diode, said Gunn diode transmitting said $f_1$ frequency when a first biasing voltage is applied, said $f_2$ frequency when a second biasing voltage is applied, and no effective output when an off-voltage approximately equal to a third biasing voltage or less is applied;

said modulating means sequentially and cyclic providing biasing voltages in an order: said first biasing voltage, said off-voltage, and said second biasing voltage and said off voltage again.

4. The range system of claim 3 wherein said receiver further includes switching means for alternatively actuating said two channels in synchronism with the transmission of said $f_1$ and $f_2$ frequencies;

and said modulation means modulates said switching means so that said channels are respectively responsive to received energy only during a portion of the time periods during which said $f_1$ and $f_2$ frequencies are respectively transmitted.

5. The range cutoff system of claim 4 wherein said modulating means modulates said switching means only during the last one-fourth of said time periods.

6. The range cutoff system of claim 5 wherein said receiver includes amplifier-limiting means so that the relative range sensitivity is substantially flat up to a preselected range and rapidly drops to zero slightly above siad preselected range.

7. The range cutoff system of claim 6 wherein said modulation means includes means for generating a clocking pulse train, said clocking pulse train forming a timing basis for the generation of said biasing voltages and having a period such that said preselected range is less than 300 feet.

8. The range cutoff system of claim 7 further including a varactor interposed between said modulation means and said Gunn diode so that said biasing voltages are applied to said Gunn diode through said varactor.

9. The range cutoff system of claim 1 wherein said frequency $f_1$ is transmitted when a first control signal is applied to said transmitter, said frequency $f_2$ is transmitted when a second control signal is applied to said transmitter, and no effective output is transmitted when a third control signal is applied to said transmitter;

and said modulating means includes means for sequentially and cyclically generating said first control signal, said third signal, said second control signal and said third signal again.

10. The range cutoff system of claim 9 wherein said modulating means generates first and second biasing voltages and an off-voltage approximately equal to or less than a third biasing voltage, wherein said first and second biasing voltages are said first and second control signals and said off-voltage is said third control signal.

11. The range cutoff system of claim 10 wherein said modulating means generates an off-voltage between 0 and slightly less than said third biasing voltage.

12. The range cutoff system of claim 10 wherein said modulating means generates and off-voltage slightly less than said third biasing voltage.

13. The range cutoff system of claim 10 wherein said modulating means generates an off-voltage between 0 and slightly more than said third biasing voltage.

14. The range cutoff system of claim 10 wherein said modulating means generates an off-voltage slightly higher than said third biasing voltage.

15. The range cutoff system of claim 9 wherein said variable output frequency transmitter includes a tuning element responsive to said modulating means for modulating the output frequency of said transmitter between said two frequencies $f_1$ and $f_2$; said modulating means modulating said transmitter between a no effective output state and effective output states coincident with the transmission of said frequencies $f_1$ and $f_2$.

16. The range cutoff system of claim 15 wherein said tuning element is a varactor.

17. The range cutoff system of claim 15 wherein said tuning element is a ferrite material.

18. The range cutoff system of claim 14 wherein said tuning element is a PIN diode.

19. A method of providing range cutoff in a radar system having a multifrequency output transmitter for transmitting energy of varying frequencies in response to varying control signals and a multichannel receiver for producing different doppler frequencies in response to the reception of said transmitted frequencies as reflected signals from targets including the steps of:

providing a first control signal to said transmitter so that a frequency $f_1$ is transmitted, providing a second control signal to said transmitter so that no effective energy is transmitted, providing a third control signal to said transmitter so that a frequency $f_2$ is transmitted, again providing said second control signal, and cyclic repeating the provision of all of said control signals.

20. The method of claim 19 including the step of:
switching said receiver between said channels so that a different channel is actuated for each of said transmitted frequencies;
and controlling said channels to be actuated only during a portion of the time period during which energy is transmitted.

21. The method of claim 20 wherein said step of controlling said channels, controls actuation of said channels only during the last one-quarter of said time period.

22. The method of claim 20 wherein said transmitter includes a Gunn diode having a characteristic of transmitting said frequency $f_1$ when a first biasing voltage serves as said first control signal, transmitting no effective energy when an off-voltage approximately equal to or below a second biasing voltage serves as said control signal, and transmitting said frequency $f_2$ when a third biasing voltage serves as said third control signal;
and including the steps of sequentially providing said first biasing voltage, providing said off-voltage, and providing said third biasing voltage so that no effective energy is transmitted after the transmission of each of said $f_1$ and $f_2$ frequencies.

23. The method of claim 22 wherein said step of controlling said channel controls the actuation of said channels only during the last one-quarter of said time period.

24. The method of claim 22 including the step of providing said off-voltage at a level between 0 and said third biasing voltage during the period when no energy is transmitted.

25. The method of claim 24 including the step of providing said off-voltage at a level slightly less than said third biasing voltage during the period when no energy is transmitted.

26. The method of claim 24 including the step of providing said off-voltage at a level slightly higher than said third biasing voltage during the period when no energy is transmitted.

* * * * *